WALTER T. SELSTED &
ROBERT E. HELLER
INVENTORS

BY Robert G. Clay

ATTORNEY

March 31, 1964 W. T. SELSTED ETAL 3,127,120

TAPE TRANSPORT MECHANISM

Filed March 13, 1961 4 Sheets-Sheet 2

WALTER T. SELSTED & ROBERT E. HELLER

INVENTORS

BY Robert G. Clay

ATTORNEY

TAPE TRANSPORT MECHANISM

Filed March 13, 1961 4 Sheets-Sheet 3

WALTER T. SELSTED &
ROBERT E. HELLER
INVENTORS

BY Robert G. Clay

ATTORNEY

WALTER T. SELSTED & ROBERT E. HELLER
INVENTORS

BY Robert S. Clay

ATTORNEY

United States Patent Office
3,127,120
Patented Mar. 31, 1964

3,127,120

TAPE TRANSPORT MECHANISM

Walter T. Selsted, Redwood City, and Robert E. Heller, San Mateo, Calif., assignors to Ampex Corporation, Redwood City, Calif., a corporation of California Filed Mar. 13, 1961, Ser. No. 95,217
8 Claims. (Cl. 242—55.12)

This invention relates to transport systems for strip material between a supply and takeup means and, more particularly, to a system for automatically moving tape between such means and securing the leading end to the takeup means for selective powered takeup thereafter.

Manual operations that are required in the use of elongated strip material for recording and reproducing information are usually tedious and time consuming. For example, it is usually necessary to thread photographic film through guide elements and past a film gate. Likewise, care must be taken in threading a magnetic tape past magnetic heads, guide elements and capstans in a magnetic tape recording and reproducing system. With magnetic tape or other similar types of systems, it may be extremely important to accomplish loading and unloading rapidly. A data processing system which is capable of very high speed operations may in effect be inoperative while tapes are being changed, and while the tape is being threaded through the various operating elements and coupled onto a takeup mechanism.

A number of automatic threading mechanisms have heretofore been employed, particularly in photographic film drive mechanisms. Such mechanisms have usually employed the relative stiffness of the photographic film and the film sprocket holes for confining the film to a restricted path while threading the film. Such systems are therefore not suitable for use with a more pliant and substantially limp material, such as magnetic tape, that must follow a relatively tortuous path between supply and takeup reels.

It is therefore an object of the present invention to provide an improved mechanism for automatically handling elongated strip material.

Another object of this invention is to provide an improved transport mechanism for automatically threading an elongated strip material from a supply source past a number of operating elements to a takeup means.

A further object of the present invention is to provide an improved transport apparatus, simpler than those heretofore known, for automatically winding a pliant and substantially limp tape from a supply mechanism onto a takeup mechanism, and rewinding the tape from the takeup mechanism to the supply mechanism.

Systems in accordance with the present invention utilize an enclosure that encompasses the path along which an elongated strip material is to be fed and to which the strip material is to be supplied. A vacuum or relatively low pressure is maintained at one end of the enclosure, with a pressure differential being created that draws the free end of a strip material from a supply means along a selected path in the enclosure to the low pressure area for engagement with a takeup member. In moving along the selected path the strip material may be required to pass through an operating zone in a controlled fashion.

An exemplary arrangement or system, in accordance with the present invention, is provided in the magnetic tape art wherein a transport mechanism is used between a rotatable supply reel upon which a magnetic tape is wound and a takeup reel. The supply reel is positioned adjacent to and the hub of the takeup reel is enclosed within a vacuum enclosure providing a confined guide path extending along a desired path of movement of the tape. The tape guide path passes adjacent to capstan and transducer elements in the operating zone of the system. The takeup reel has a hollow hub with surface apertures communicating with a source of low pressure provided by an external vacuum source to provide an air flow within the confined guide portion of the vacuum enclosure between the supply and takeup reel areas. A magnetic tape loaded upon the supply reel, therefore, has a free outer end subjected to a pulling force created by the air flow through the confined guide path past capstan, transducer and guide elements. The supply reel is rotated at a rate such that the extended section of magnetic tape threads without impediment through the confined guide path to come into engagement with the surface of the takeup reel hub through which the air is drawn and the engagement is maintained by the suction force through the hub. The takeup reel is concurrently rotated at a rate that causes the tape to be drawn substantially taut between the takeup and supply reels, thus actuating a switch member to initiate operation of the normal tape driving mechanism. Also, another feature of the invention provides that when the tape has been substantially fully removed from the supply reel and on to the takeup reel, a detecting element positioned adjacent to the path of movement of the tape senses the presence of an indicia on the tape, and actuates a rewind mechanism to cause the tape transport mechanism to be reversed, so that the tape is rewound back onto the tape supply reel.

Further objects and advantages together with a better understanding of the invention may be had by reference to the following description, taken in conjunction with the accompanying drawings, in which.

Figure 1:
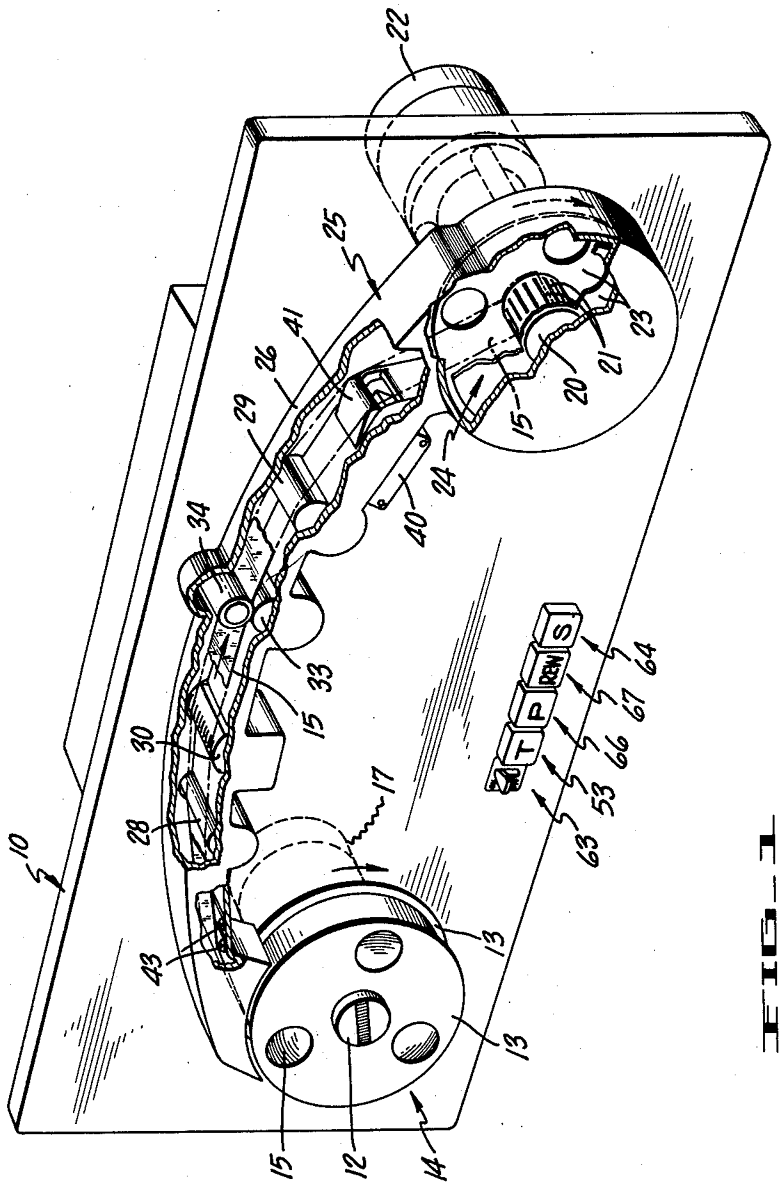
FIGURE 1 is a perspective view, partially broken away, of a tape transport system in accordance with the present invention.
Figure 2:
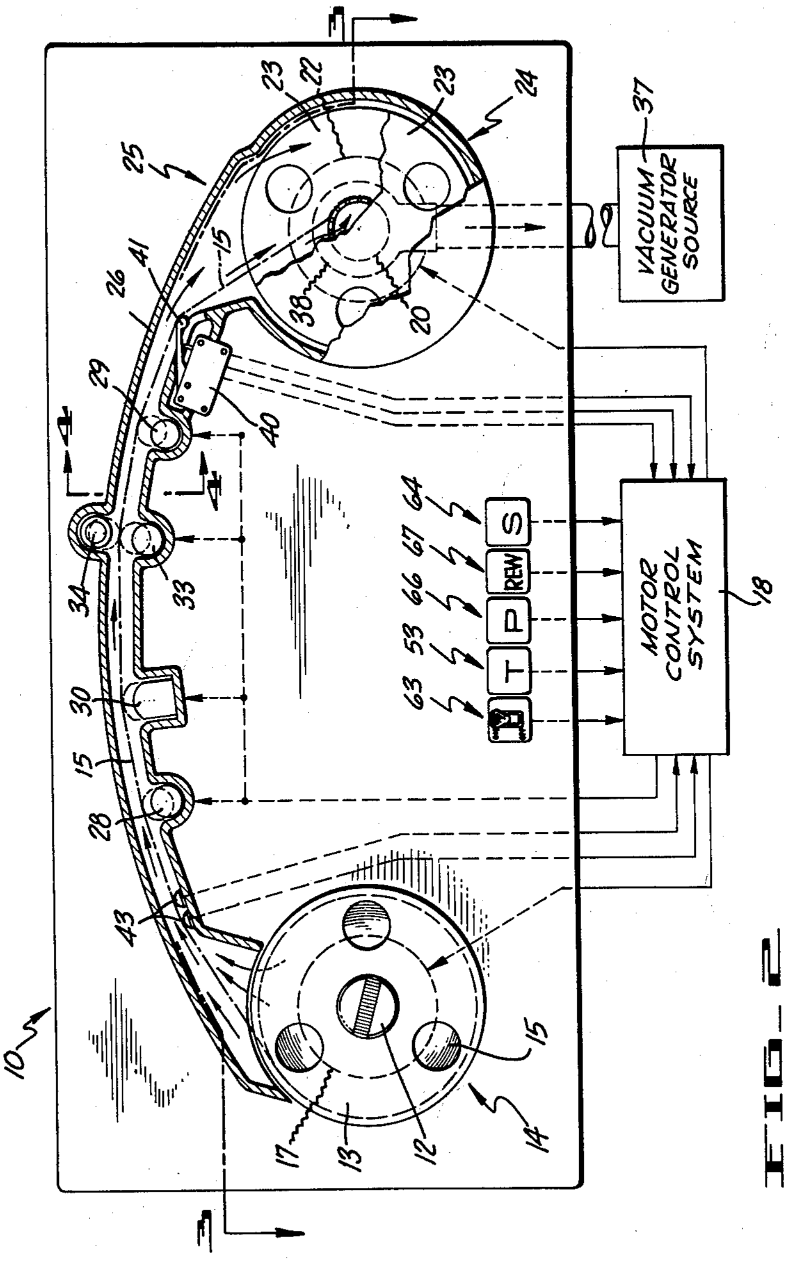
FIGURE 2 is a front view, partially broken away, of the system of FIGURE 1.
Figures 3, 4, 5:
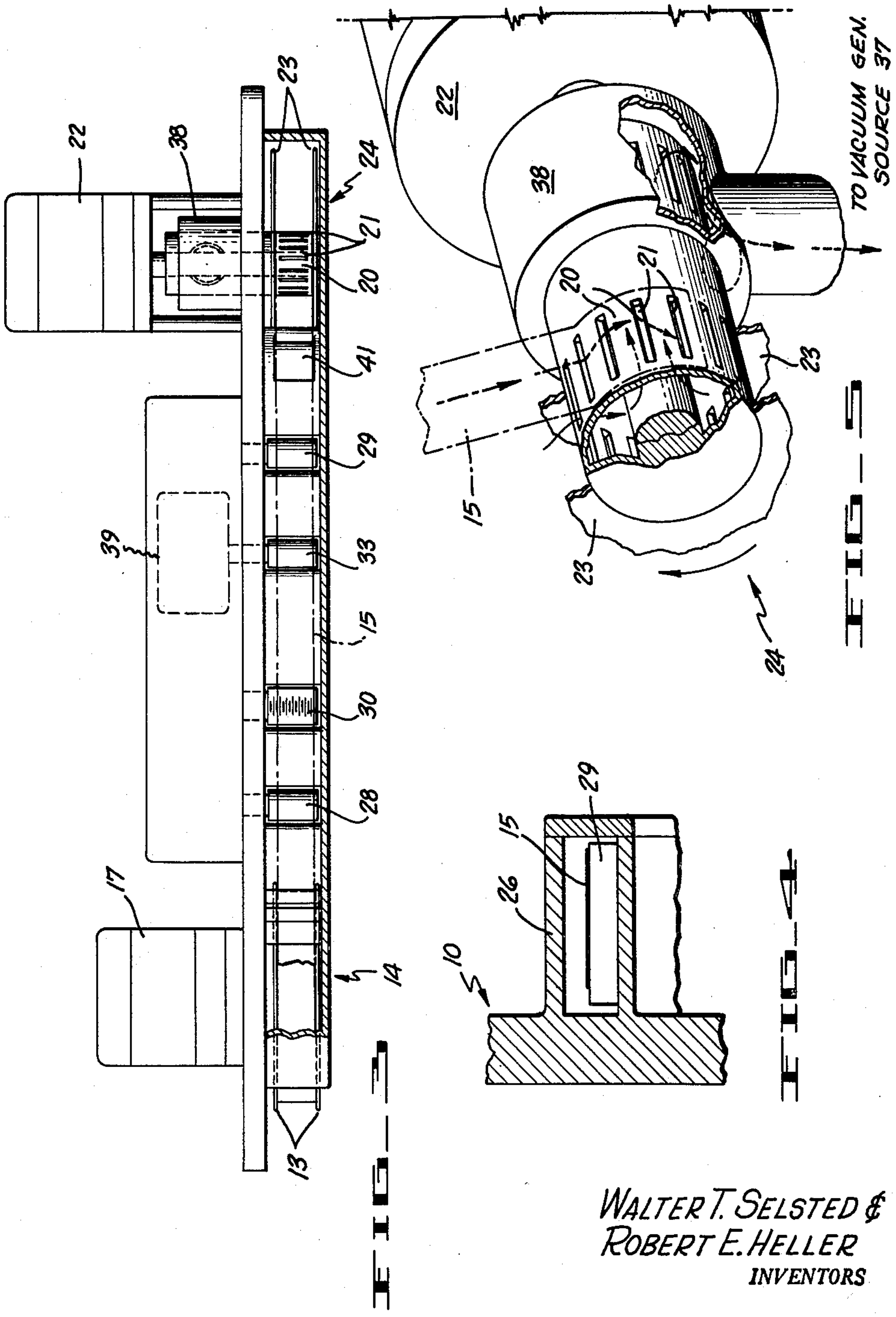
FIGURE 3 is a view of the system of FIGURE 2 taken along the line 3—3.
FIGURE 4 is a fragmentary sectional view of the invention of FIGURES 1 to 3, taken along the lines 4—4 in FIGURE 2.
FIGURE 5 is an enlarged perspective view of a part of the invention of FIGURES 1 to 3.

Referring now to FIGURES 1 to 3, a tape transport mechanism, in accordance with the invention, is shown illustrating the manner in which a pliant, substantially limp, magnetic tape is automatically threaded, wound, and rewound without requiring manual handling by an operator. The various elements that are utilized are mounted on a base plate 10, shown only generally, but representing a typical chassis for magnetic tape equipment which includes recording and reproducing amplifiers and various associated processing equipment. A supply reel hub 12 is rotatably mounted on the base plate 10, and together with extending flanges 13 provides a supply reel 14 upon which a magnetic tape 15 is wound. The outer end of the wound tape 15 is free to be separated from the principal body as wound on the reel 14, but the inner end of the tape 15 may be assumed to be fixed by detachable means (not shown in detail) to the reel 14. A bidirectional driving motor 17 is coupled to the supply reel hub 12 for driving the supply reel 12 in a selected direction (clockwise as viewed in FIGURE 2) at a first selected peripheral velocity for the automatic threading operation. A motor control system 18 (see FIGURE 2) including servo devices (not shown) is coupled to control the motor 17 during normal operation, and to effect rotation of the hub 12 in the opposite, rewind direction upon provision of a rewind signal.

A takeup reel hub 20 (seen in best detail in the fragmentary view of FIGURE 5) is also rotatably mounted on the base plate 10 at a position which is spaced apart from the supply reel 14. The takeup reel hub 20 has a hollow interior and includes surface apertures 21, which permit communication of air between the hollow interior of the hub 20 and the surrounding environment. A bidirectional driving motor 22 coupled to the takeup reel hub 20 operates in a manner similar to the supply reel driving motor 17 and is likewise governed by the motor control system 18. Flanges 23 extend outwardly from the takeup reel hub 20 to restrict lateral movement of the tape 15 and to define the remainder of the takeup reel 24.

The takeup reel 24 is encompassed by a vacuum enclosure 25, a part of which may be defined by the supporting base plate 10. The vacuum enclosure 25 extends along a hollow relatively elongated magnetic tape guide member 26 (best seen in the cross-sectional view of FIGURE 4) to an entry end adjacent to the supply reel 14. The central axis of the guide member 26 defines the path of movement, which the magnetic tape 15 is to follow, between the supply reel 14 and the takeup reel hub 20. Between the supply takeup regions, the tape 15 moves past an operating zone, in which are positioned roller guide elements 28, 29, a magnetic transducer 30, a drive capstan 33 and an associated pinch roller device 34. The guide elements 28, 29, the magnetic transducer 30, the drive capstan 33 and the pinch roller 34 are contained within the guide member 26, part of the vacuum enclosure 25, which is appropriately configured to receive them. The various elements are mounted on conventional movable support means (not shown) so that they may be moved with respect to the base plate 10 and the tape 15. Prior to threading of the tape 15, the elements are maintained in rest positions in which they are spaced apart from the path of movement of the magnetic tape 15. When actuated at various times, as described in more detail below, these various elements are moved into positions of engagement with the tape 15 in which each may perform its respective function.

A pressure differential and flow of air is maintained from the region of the periphery of the magnetic tape reel 14 through the hollow tape guide member 26 and to the periphery of the takeup reel hub 20 by a vacuum generator source 37 (best seen in FIGURES 3 and 5) coupled through tubing and a rotary joint 38 so as to communicate with and maintain in some degree of vacuum in the hollow interior of the takeup reel hub 20. The term "vacuum" is not intended to connote that a high degree of vacuum is required, but merely that a relatively low pressure is maintained in the interior of the takeup reel hub 20 by comparison to the pressure of the region from which the tape 15 is to be drawn.

The drive capstan 33 is rotated by a drive motor 39 (see FIGURES 3, particularly), which is mounted on the base plate 10. A tension switch 40 is mounted adjacent the path of movement of the magnetic tape 15 at a point at which the tape bends from a movement along the tape guide member 26 into a direction toward the tape takeup reel hub 20. The tension switch 40 may be any conventional type of switch suitable for performing this function, such as a switch having a protruding spring loaded actuating arm 41 extending into engagement with the taps 15. A selected amount of force against the arm 41 thus overcomes the spring loading so as to actuate the switch 40 and provide a "tape threaded" signal to permit the system to begin normal operation. After being moved past the point of actuation of switch 40, the arm is drawn to a further position in which it has several degrees of motion in either direction, and thus is caused to act as a takeup tension arm for the tape during operation.

For the purpose of detecting the unwinding of the magnetic tape 15 to an extent at which the mechanism is ready for the rewinding operation, a conductive coating (not shown in detail) may be placed on a portion of the tape adjacent the innermost end of the reel 14. A pair of contacts 43 are coupled in an electrical circuit to supply a rewind signal to the motor control system 18 whenever a circuit is completed between the separate contacts 43 by the conductive coating on the tape 15. Actuation of the switch 43 in turn actuates the motor control system 18 so that the motors 17 and 22 which drive the supply reel 14 and the takeup reel 24 are caused to rewind the tape back onto the supply reel 14. The contacts 43 are positioned adjacent to the path of the magnetic tape 15 so as to remain in contact with the tape 15.

It will be understood that the transport as above described has at least three modes of operation: (*a*) The "threading" mode, in which reel 14 rotates clockwise as seen in FIGURE 2, while reel 24 also rotates clockwise but at such a speed that the periphery of hub 20 has a tangential velocity slightly greater than the tangential velocity of reel 14 at the radius of the outer coil of tape, so that when the leading end of the tape 15 encounters hub 20 the hub tends to draw the tape faster than the tape is coming from the reel 14, and so tensions the tape over switch 40; (*b*) the "play" mode, in which the transducer 30 and the guides 28 and 29 are engaged with the tape 15, and the capstan 33 and pinch roller 34 are also engaged to drive the tape to the right as seen in FIGURE 2, while the reel 24 is rotated clockwise to take up the tape moved by the capstan, and reel 14 is operated to drag against the pull of the capstan (i.e., either to tend to rotate counter-clockwise, or to resist clockwise rotation); and (*c*) the "rewind" mode, in which at least the capstan 33 and pinch roller 34 are disengaged from the tape 15 and reel 14 is operated in the counter-clockwise direction (FIGURE 2) to rewind the tape, while reel 24 is operated to drag against the pull of reel 14 so as to prevent slack from developing during the rewind operation.

Figure 6:
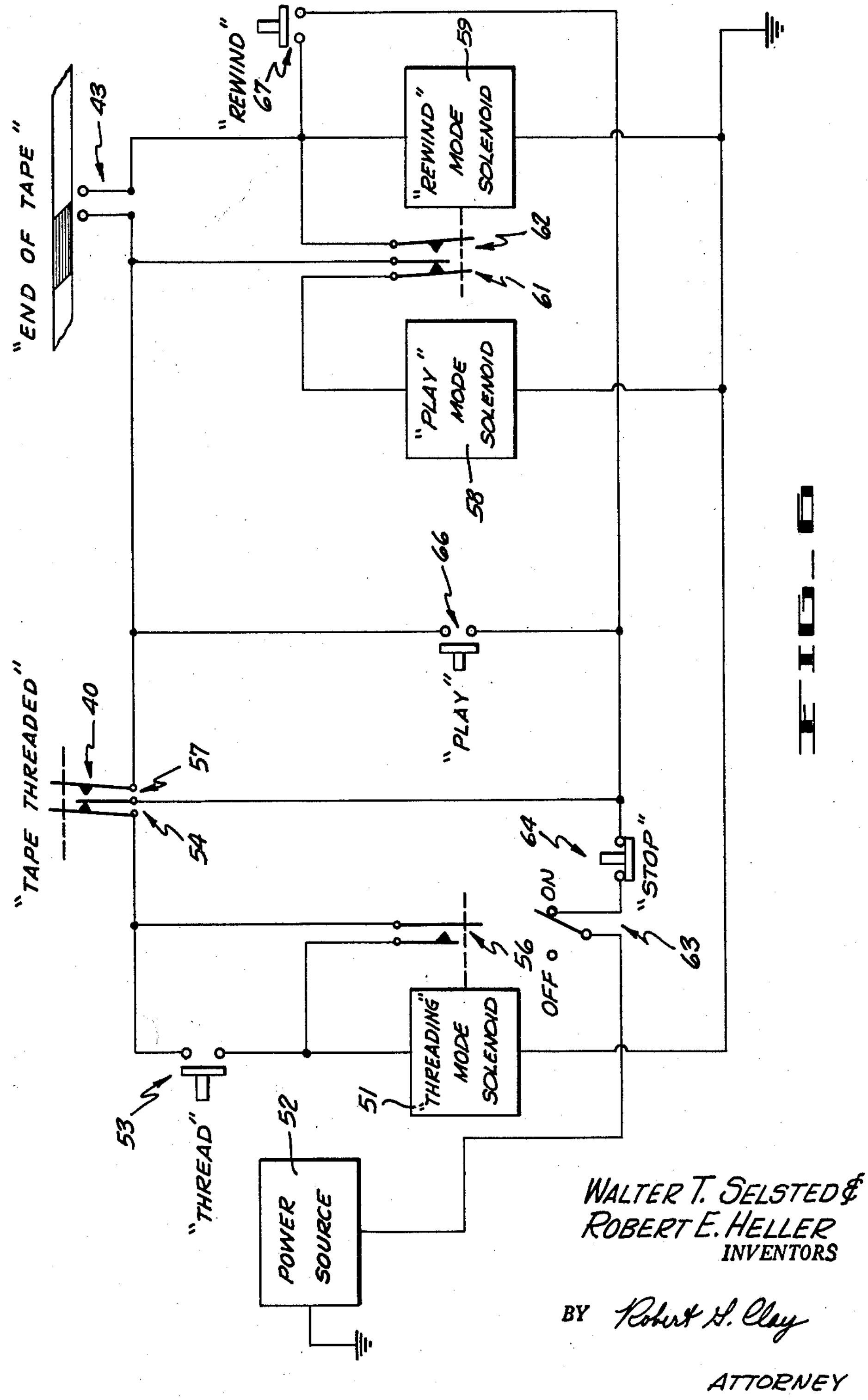
FIGURE 6 is a schematic circuit diagram of a portion of the motor control apparatus, in accordance with the invention of FIGURES 1 to 5.

The actuation of motors 17, 22 and 39 and the engagement and disengagement of capstan 33 and pinch roller 34 to achieve the above described operational modes are my means and methods well known in the art and not here described. However, referring now to FIGURE 6, there is shown an arrangement for controlling the actuation of the motors and capstan to produce coordinated automatic operation of the transport through the "threading," "play" and "rewind" modes, as follows:

A "threading" mode solenoid 51 is connected to ground and to a power source 52 through a normally-open manually-operated "thread" switch 53 and a pair of normally-closed contacts 54 of the tension switch 40. The solenoid 51 is connected to the motors 17 and 22 to operate them in the threading mode as above described. Thus, the operator may initiate the threading mode of operation by manually closing switch 53, energizing solenoid 51. Upon energization, solenoid 51 also closes a pair of normally-open contacts 56 connected in parallel with the switch 53, so that the solenoid 51 locks itself in, at least until the circuit is broken otherwise than by relieving the manual pressure on switch 53. When the threading operation has progressed to the degree that the tape is tensioned over switch 40, the contacts 54 are opened and the solenoid 51 is de-energized. The operation of the switch 40 also closes a pair of normally-open contacts 57 connected between the power source 52 and a "play" mode solenoid 58, which is also connected to ground.

Thus the operation of switch 40 energizes solenoid 58, which is connected to the motors 17 and 22, the capstan 33, the pinch roller 34, the transducer 30, and the rollers 28 and 29 to operate them in the "play" mode as above described. When the tape has been played through to the end and the switch 43 is closed, a circuit is made from power source 52 through contacts 57 and contacts 43 to a "rewind" mode solenoid 59 and thence to ground so as to energize the solenoid 59. The energization of solenoid 59 opens a pair of normally-closed contacts 61 which when closed connect solenoid 58 to the power source and closes a pair of normally open contacts 62, which connect rewind mode solenoid 59 to the power source. Contacts 62 are connected in parallel with contacts 43. Thus the momentary closing of contacts 43 to energize solenoid 59 also has the effect of de-energizing solenoid 58 and locking in solenoid 59, and solenoid 59 remains energized even after contacts 43 are opened. Solenoid 59 is connected to the motors 17 and 22 to operate them in the rewind mode as above described. The capstan 33 and pinch roller 34 are disengaged upon de-energization of solenoid 58, and the transducer 30 and rollers 28 and 29 may also be retracted by de-energization of solenoid 58. When the tape has been completely rewound to the degree that the end of the tape comes off the hub 20 of reel 24, the tension on switch 40 is relieved, and switch 40 returns to its normal inactivated position with contacts 57 open, so as to break the energizing circuit to solenoid 59. Thus, the system is restored to its initial inoperative condition, ready for another threading operation.

It will be noted that an "off-on" switch 63 and a "stop" switch 64 are connected between the power source 52 and all of the other circuit elements. If the operator desires to stop the operation of the transport during any of its modes, he may manually press the stop switch 64 which breaks any circuit in operation. When pressure is relieved on stop switch 64 the transport is returned to its initial inoperative condition. It will be understood that when the motors 17 and 22 are de-energized the tension of the tape on switch 40 is relaxed and contacts 57 are then opened. Consequently, when the operator desires to resume operation, he must selectively initiate one of the three operating modes. For "threading" he may operate switch 53. For "play" he may operate a normally-open switch 66 connected in parallel with contacts 57, so that the circuit to solenoid 58 is momentarily closed. The operation of motors 17 and 22 in the "play" mode then restores tension to the tape over the switch 40 and recloses contacts 57, and the pressure on switch 66 may be relieved. When it is desired to initiate operation in the "rewind" mode, the operator may press a normally-open manually-operated switch 67 connected in parallel with the contacts 43 and contacts 57. The solenoid 59 is thus energized, locking itself in, and operating the motors 17 and 22 in the rewind mode and so as to restore tension in the tape over the switch 40 to reclose contacts 57, when pressure on switch 67 may be relieved.

The three solenoids 51, 58 and 59 are also connected so that upon energization they release reel brakes (not shown); and the brakes are arranged to stop motion of the reels whenever none of the solenoids are energized.

Referring now specifically to FIGURES 1, 2 and 3, automatic threading of a tape 15 may begin when a new supply reel 14 is engaged to the shaft of the supply reel motor 17. Prior to threading of the tape 15, the various elements 28, 29, 30, 33 and 34 which are positioned along the path of movement of the tape 15 and which effect the actual recording and reproduction are moved to the positions in which they are disengaged from the tape 15. To initiate operation, a vacuum or relatively low pressure is established in the hollow interior of the takeup reel hub 20 by the vacuum generator source 37. The supply reel 14 and takeup reel 24 are rotated at selected rates such that the peripheral velocity of the free outer end of the tape 15 is somewhat less than the peripheral velocity of the surface of the takeup reel hub 20. The existence of the vacuum in the hollow interior of the takeup reel hub 20 causes a pressure gradient along the vacuum enclosure, and an air flow passing from the entry end of the tape guide member 26 adjacent the supply reel 14. The suction which thus exists acts upon the free end of the wound tape on the supply reel 14, causing the free end to be drawn through the interior of the tape guide member 26 as the supply reel 14 rotates. The forces acting on the tape 15 because of this suction are arranged to tend to move the tape at a velocity which is slightly greater than the velocity permitted because of rotation of the supply reel 14. Therefore, the tape 15 tends to extend linearly out from the supply reel 14 and to proceed along the center of the tape guide member 26 without buckling or forming into loops. The tape does not follow a strictly linear path, but conforms to the path defined by the curves in the guide member 26, being linear along lengths in which the guide member is linear.

The free end of the tape 15 therefore proceeds automatically through the tape guide member 26 into the vicinity of the enlarged part of the vacuum enclosure 25 which encompasses the takeup reel 24. Within this enclosure, the tape 15 is drawn directly to the outer periphery of the takeup reel hub 20, and is held against the surface of the takeup reel hub 20 by the interior vacuum. The tape 15 therefore begins to wind about the rotating takeup reel hub 20, with the innermost turn of the tape being held in fixed relation to the periphery of the takeup reel hub 20. Because the peripheral velocity of the takeup reel hub 20 is slightly greater than the peripheral velocity with which the tape leaves the supply reel 14, the tape is drawn taut within the tape guide member 26. This condition signifies that the tape has properly been threaded from one reel to the other, and that normal signal recording and reproducing operations may commence.

To initiate normal operations, the taut tape 15 bears against the actuating arm 41 of the tension switch 40, and when the arm 41 is sufficiently depressed the "tape threaded" signal is provided to the motor control system 18. This signal may also be used to return the guide elements 28, 29, magnetic transducer 30 and the drive capstan 33 to their active positions of operation in which they are in engagement with the tape 15. The pinch roller 34 is moved into a position in which it is in close proximity to the drive capstan 33, that it may drive the tape 15 by selectively engaging the tape against the rotating drive capstan 33. It will be understood that additional or alternative drive capstan and pinch roller arrangement may be employed if desired, and that other arrangements of magnetic transducers may also be employed. Once the "tape threaded" signal is received, the motor control system 18 operates the motors 17 and 22 intermittently or continuously in conjunction with the functioning of the drive capstan mechanism to carry out the desired recording or reproduction of signals.

Normal operation of the system may continue until substantially all of the tape 15 originally wound on the supply reel 14 has wound about the takeup reel hub 20. To effect automatic rewind of the tape 15, the conductive layer adjacent the innermost end of the tape at the supply reel 14 is detected. When this conductive layer passes the separated contacts 43 and the switch 40 is in a completed circuit, the rewind signal from the switch 43 actuates the motors 17 and 22 through the motor control system 18. When the tape 15 is fully rewound, the supply reel 14 may be replaced with a new fully wound supply reel and the operation may be repeated, including automatic threading, controlled winding and automatic rewinding.

Thus, there has been described an improved system for automatically threading and transporting an elongated strip member, as exemplified, but not limited, with respect to a pliant magnetic tape system. While various alternative arrangements have been shown and described, it will be appreciated that other modifications and variations may be made, and that the scope of the invention is therefore to be defined by the appended claims.

What is claimed is:

1. A threading mechanism comprising: a length of pliant, substantially limp strip material, means providing a supply of said strip material, enclosure means defining a substantially enclosed strip material guide path initiating adjacent to the supply means, and strip material takeup means enclosed within the enclosure means and including pneumatic means for creating a pressure differential along the enclosure means, with said pressure decreasing in value from said supply to said takeup means.

2. A system for automatically threading a substantially limp tape from a supply means to a takeup means past an operating zone including the combination of a length of said tape, a tape takeup hub forming a part of the tape takeup means and including a hollow interior and surface apertures permitting the communication of air with the hollow interior, means coupled to the hollow interior of the tape takeup hub for establishing a low pressure therein, vacuum enclosure means encompassing the tape takeup means and extending in a confined guide path through the operating zone to an entry end in the vicinity of the tape supply means, and means coupled to the tape supply means and the tape takeup means for rotating the two means with a predetermined speed relationship during the tape threading operation.

3. Tape threading and transport apparatus for automatically transporting a tape past an operating zone including a rotatable tape supply means, rotatable tape takeup means including a rotatable suction member and spaced apart from the tape supply means, means enclosing the tape takeup means and providing a confined guide path from the takeup means through the operating zone and back to the region of the tape supply means, such that the suction at the rotatable suction member establishes a pressure differential to draw a tape through the confined guide path, means for rotating the tape supply means and the tape takeup means in a selected velocity relationship during the automatic threading operation, and means positioned adjacent the confined guide path for detecting the completion of automatic threading of the tape.

4. Apparatus as described in claim 3, wherein said last-named means includes a tape tension arm engageable with said tape and displaceable thereby to a tape-threaded position, and switch means coupled with said tension arm for actuation in said tape-threaded position of said arm.

5. A tape transport system including a length of pliant, substantially limp tape, a rotatable supply reel therefor, a rotatable takeup reel having an apertured hollowed hub positioned on the opposite side of an operating zone from the supply reel, a hollow vacuum enclosure member disposed about the takeup reel and including a guide path enclosure member which encompasses the operating zone and has an entry end adjacent the supply reel, and vacuum source means coupled to the hollow hub of the takeup reel for establishing a pressure differential in the vacuum enclosure member with the lowest pressure being maintained in the vicinity of the apertured hub.

6. A tape drive system comprising: a pliant, substantially limp tape, a rotatable tape supply reel hub upon which the pliant, substantially limp tape may be reeled, a rotatable tape takeup reel hub spaced apart from the tape supply reel hub, the rotatable tape takeup reel hub having an apertured periphery and a hollow interior, means substantially enclosing the tape supply reel hub and the tape takeup reel hub and defining an elongated tape guide column therebetween, tape driving means positioned along the tape guide column within the enclosure means, vacuum means coupled to the tape takeup reel hub and providing a pressure differential along the tape guide column from the periphery of the tape takeup reel hub to the outer end of a magnetic tape disposed about the tape supply reel hub.

7. A system for automatically winding a pliant, substantially limp, magnetic tape from a supply reel hub onto a takeup reel hub, and automatically rewinding the magnetic tape from the takeup reel hub back onto the supply reel hub, comprising a frame member, a rotatable supply reel mounted in the frame member, the supply reel being adapted to receive a wound magnetic tape having a free end at its outer periphery, first bidirectional rotational means coupled to the supply reel for rotating the supply reel at a first selected rate in a given direction, a takeup reel mounted rotatably in the frame and spaced apart from the supply reel, the takeup reel including a takeup reel hub that is hollow and has an apertured surface, second bidirectional rotational means coupled to the takeup reel for rotating the takeup reel in a selected direction with a second rotational rate, a vacuum enclosure means mounted on and defined by a portion of the frame member and encompassing the takeup reel, the vacuum enclosure means also being configured to define a relatively confined tape guide path along the frame member between the supply and takeup reels, magnetic transducer elements positioned along the confined guide path within the vacuum enclosure means, vacuum generator means coupled to the hollow takeup reel hub, the vacuum generator means providing a pressure differential between the apertured surface of the takeup reel hub and the region of the tape supply reel, to draw the free end of the tape on the tape supply reel through the confined guide path at a rate which tends to maintain the tape extended, thus permitting the end of the tape to engage the apertured surface of the takeup reel hub, tape tension switch means adjacent the path of the tape for detecting a taut condition in the tape in the confined guide path to signal the end of the tape threading operation, and means positioned adjacent the path of the tape for detecting the unwinding of substantially all the tape from the supply reel to initiate the rewind operation.

8. A magnetic tape storage and driving system including a tape takeup reel, a tape supply reel spaced apart from the takeup reel, the tape takeup reel including a hub having a hollowed center and a perforated surface providing air communication with the hollowed center, bidirectional reel driving means coupled to each of the reels for selectively rotating the reels in a winding direction, with the takeup reel hub turning at a peripheral velocity which is in excess of the peripheral velocity of the outer turns of a full tape wound on the tape supply reel hub, magnetic transducer means positioned along the path of the movement of the tape between the tape supply reel and tape takeup reel, the magnetic transducer means being movable into engagement with and out of engagement with the magnetic tape, capstan means, for selectively engaging and driving the tape, positioned along the path of movement of the magnetic tape between the supply reel and the takeup reel, vacuum enclosure means encompassing the takeup reel and having an entry end adjacent the supply reel, the vacuum enclosure means being configured to provide an elongated air passage between the supply and takeup reels which is slightly greater than the cross-sectional dimensions of a magnetic tape, the communicating air passage defining the magnetic tape path between the supply and takeup reels and encompassing the transducer means and the capstan means, vacuum generator means coupled to the hollow center of the perforated tape takeup reel hub for establishing a pressure differential and an air flow in the enclosure means, the pressure differential extending through the communicating air passage to the region about the tape supply reel, thus tending to draw the free outer end of a magnetic tape wound about the tape supply reel through the communicating air passage to the surface of the tape takeup reel hub at a velocity in excess of the velocity permitted by the rotation of the tape supply reel, so that the tape remains substantially directly extended through the communicating air passage, tension switch means disposed adjacent the path of the magnetic tape and positioned to be actuated when the tape is drawn taut by the tape takeup reel hub following adherence of the free end of the tape to the outer surface of the tape takeup reel hub, the tension switch means signalling the completion of automatic threading of the tape, and means adjacent the path of the magnetic tape for detecting indicia on the tape adjacent the innermost end of the tape on the supply reel, for actuating the motor means coupled to the tape supply reel and tape takeup reel to cause the reels to rotate in a rewind direction.

References Cited in the file of this patent

UNITED STATES PATENTS

| | | |
|---|---|---|
| 2,503,453 | Pratt et al. | Apr. 11, 1950 |
| 2,578,283 | Bernemann et al. | Dec. 11, 1951 |
| 2,998,206 | Pendleton | Aug. 29, 1961 |

FOREIGN PATENTS

| | | |
|---|---|---|
| 230,942 | Australia | May 21, 1959 |